United States Patent [19]

Cadel et al.

[11] Patent Number: 4,668,747
[45] Date of Patent: May 26, 1987

[54] PREPARATION OF WATER SOLUBLE CATIONIC ACRYLAMIDE POLYMER AND PRODUCT USING WEAK ACID TO ADJUST PH

[75] Inventors: Jeffrey S. Cadel, Camillus; Eric H. Larson, Marcellus, both of N.Y.

[73] Assignee: Allied Corporation, Morris Township, Morris County, N.J.

[21] Appl. No.: 761,089

[22] Filed: Aug. 2, 1985

Related U.S. Application Data

[63] Continuation-in-part of Ser. No. 653,253, Sep. 24, 1984, abandoned.

[51] Int. Cl.[4] .............................. C08F 2/32; C08F 2/00; C08F 220/60
[52] U.S. Cl. .................................... 526/216; 526/307; 526/281; 526/292 L
[58] Field of Search ...................... 526/303.1, 214, 216, 526/225, 307

[56] References Cited

U.S. PATENT DOCUMENTS

| | | | |
|---|---|---|---|
| 3,344,100 | 9/1967 | Donat et al. | 260/23.7 |
| 3,929,751 | 12/1975 | Gershberg | 526/303.1 |
| 4,024,040 | 5/1977 | Phalangas et al. | 526/303.1 |
| 4,195,147 | 3/1980 | Sekmakas et al. | 526/312 |

OTHER PUBLICATIONS

Chemical Abstract No. 91:124645n.
Chemical Abstract No. 90:187925d.

Primary Examiner—Joseph L. Schofer
Assistant Examiner—Peter F. Kulkosky
Attorney, Agent, or Firm—Jay P. Friedenson

[57] ABSTRACT

Use of dicarboxylic acid in the preparation of cationic water soluble polymers useful in flocculation of suspended solids in various waste waters is disclosed. The dicarboxylic acids are shown to improve stability of cationic functionality and enhance distribution of charge.

10 Claims, 1 Drawing Figure

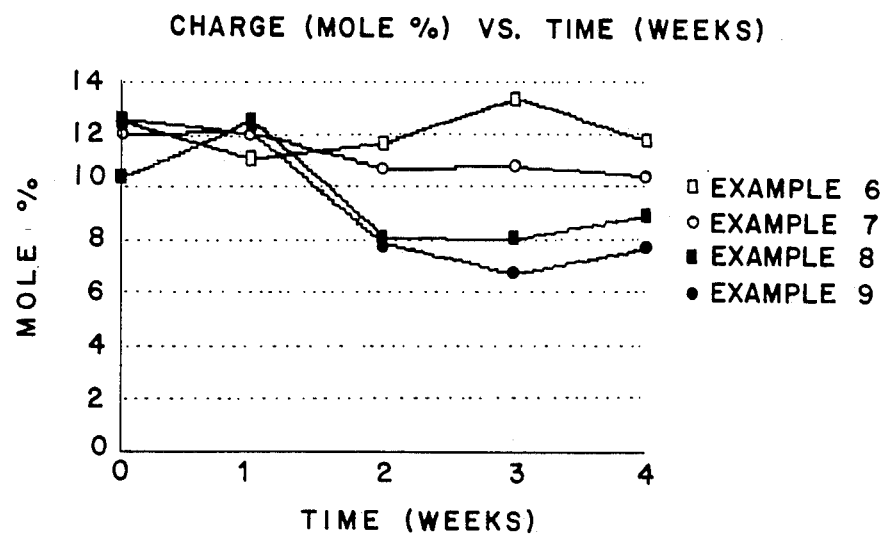

PREPARATION OF WATER SOLUBLE CATIONIC ACRYLAMIDE POLYMER AND PRODUCT USING WEAK ACID TO ADJUST PH

DESCRIPTION

This application is a continuation-in-part of our application Ser. No. 653,253 filed Sept. 24, 1984, now abandoned.

This invention relates to the use of acids in conjunction with and to improve the performance and stability of cationic water soluble water treatment polymers having a quaternary amine functionality, and copolymers thereof, with ethylenically unsaturated monomers. These polymers may be prepared by reaction in the presence of free radical initiators or ionizing radiation.

In the invention dicarboxylic acid is used to improve the performance and stability of cationic water treatment polymers. The procedure can be used in both solution and emulsion (water/oil) reactions. The performance of water treatment polymers of this kind relates to the dewatering capability of the polymer based on a SFR (specific filter resistance) test of total drainage of the supernatant through the sludge in comparison to dose. Stability relates to the performance of the polymer and retention of cationic charge.

The performance of cationic polymer can be related to a number of different variables including: (1) molecular weight, (2) charge, (3) charge distribution. The method of this invention involves the effect on the charge distribution in the polymer during the course of the reaction through the use of a dicarboxylic acid, and buffering capability in the reaction mass to maintain the desired charge in the polymer after the completion of the reaction.

The use of these cationic polymers is widespread. They are useful as drainage aids, flotation aids, retention aids, process water flocculants, and in the manufacture of paper and paper products, waste effluent treatment, oil recovery operations, and mining operations.

The major difficulty in preparing these cationic products relates to the differences in reactivity between the acrylamide (the major backbone in these polymer formulations) and the cationic co-monomers. In the prior art, in an effort to attain better co-monomer distribution in the copolymer, the cationic co-monomer was added in increments over the course of the reaction to prevent the homopolymerization of the cationic monomer substrate and force the reaction between the monomers present. A second problem is the lack of hydrolytic stability of quaternary cationic monomers and the resulting polymers; a means for suppressing this hydrolytic degradation would therefore be desirable.

Cationic water soluble polymers have been found to be relatively difficult to produce and apply because of the poor hydrolytic stability of the product polymer and in the case of most cationic monomers, difficulties occur in the polymerization because the relative reactivities of the cationic monomers are much higher than the usual comonomers. The high reactivity of the cationic monomers leads to production of an initial fraction during the copolymerization of material that is excessively high in cationic content and a later fraction almost devoid of cationic content. Materials polymerized in this fashion do not exhibit the same application activity as materials produced with an even distribution of charge during the polymerization.

The acidification of a mixture containing ethylenically unsaturated cationic and nonionic monomers is described in U.S. Pat. No. 3,929,751 (Gershberg); U.S. Pat. No. 4,195,147 (Sekmakas, et al); and U.S. Pat. No. 4,024,040 (Phalanges, et al.).

The work of Gershberg discloses the addition of sulfuric acid to adjust the pH of an aqueous phase reaction containing various monomers including cationic monomers described in this invention. The pH range considered optimum for the invention described by Gershberg is clearly outside that considered optimum for the present invention and the use of strong acids does not give the desirable results of the weaker acids disclosed as suitable in the present invention.

Phalanges, et al. discloses polymerization by radiation in the range of pH 2 to 5 for the purpose of preventing certain aluminum salts from precipitating out of solution. These aluminum salts are in solution for the purpose of preventing crosslinking of the polymer which will occur as the conversion of the monomer nears completion. Phalanges does not disclose the advantages of any particular type of acid, nor the benefits of using acids other than those preventing the precipitation of salts present in the system of that patentee.

Sekmakas, et al. discloses the use of acids in the preparation of tertiary amine copolymers for use in electrocoating by neutralizing the amine functionality with various acids to a pH in the general range of 5 to 7. This pH range is outside the range of interest in the present invention. As the functional group involved in Sekmakas, et al., is a tertiary amine, the chemical nature of the compounds is completely at variance with the subject of this invention. In fact, Sekmakas discusses this possibility and rejects it as not feasible because of the large amount of acid required to neutralize the amine salt functionality.

A need accordingly exists for a means to enhance the electrolytic stability of the cationic functionality of acrylamide polymers and to improve the relative reaction rates of acrylamide and the cationic comonomer.

SUMMARY OF THE INVENTION

In accordance with the invention, an acid additive is utilized to control the polymerization to produce a more uniform comonomer rate of reaction.

The presence of acid in the resulting cationic product increases its shelf life and hydrolytic stability. Particular processing advantages include the elimination of the requirement of continuous feed of cationic monomer and the resulting potential contamination of the reaction mass with air, and the production of solution gel products of good charge distribution where continuous monomer feed is impractical because of the high viscosity and blending difficulties inherent in the production of solution gels.

In accordance with the invention, novel polymeric compositions having exceptionally well distributed and active cationic charge are prepared. These materials are highly useful in flocculation, sludge dewatering as retention and flotation aids and other water treating applications. These water soluble polymers contain segments of acrylamide or methacrylamide, acrylic acid or methacrylic acid, salts thereof, dimethylamino ethyl methyl acrylate quaternary salts, and other ethylenically unsaturated comonomers containing quaternary amine functional groups.

Typical quaternary amine cationic monomers include: 1-trimethylammonium-2-hydroxypropylmethacrylate methosulfate, trimethylammonium-2-hydroxypropylacrylate methosulfate, 1-trimethylammonium-2-2-hydroxypropylacrylate methosulfate, 3-methacrylamidopropyltrimethylammonium chloride, dimethylaminoethylmethacrylate methylchloride quat, and the like. The repeating monomer units of the polymer will include anywhere from 1–70 mole % of the cationic monomer with the remainder being a nonionic substrate such as: acrylamide, methacrylamide, N-methyl acrylamide, N-methylmethacrylamide and the like. The acid employed in the copolymerization may be a mineral acid, an organic carboxylic acid as a dicarboxylic acid. Dicarboxylic acids, particularly adipic and succinic acids are preferred.

An object of the invention is the provision of a process for the development of cationic water soluble polymers having excellent charge distribution and cationic charge stability. Polymers manufactured by this process have many advantages over these currently available. The primary advantage is improved charge distribution over current systems. Another object of this invention is not to necessarily neutralize an amine salt functionality but to provide a pH where the monomers described are hydrolytically stable and where the copolymerization kinetics are most favorable. Other advantages include increased activity and shelf life of the resulting products, increased performance in high pH applications, and production of the material in various forms including solutions, solution gels and emulsions.

The invention permits the preparation of novel water treatment polymers containing at least a small proportion of cationic functionality provided by the comonomer. These new flocculant compositions are obtained by polymerizing ethylenically unsaturated monomers containing quaternary amine functionalities with essentially nonionic monomers to obtain a polymer containing an improved charge distribution in the presence of acid.

This invention can be applied to polymerizations conducted in aqueous solutions, solution gels and emulsion products. The polymerization can be initiated by free radical initiators such as ammonium persulfate, 2,2' azobis(2,4 dimethyl valeronitrile) and by UV light, gamma radiation and other ionizing radiation. One particularly desirable implementation of the subject invention is the production of cationic polymers in emulsion form.

Additional objects and advantages of the invention will become apparent from the description and examples provided hereinafter.

BRIEF DESCRIPTION OF THE DRAWING

Illustrated in the figures of Drawing 1 is the effect of the various types and level of acids on the stability of the charge present on the product polymer. The drawing is further discussed in conjunction with Example 9.

DESCRIPTION OF THE PREFERRED EMBODIMENT

The inverse emulsion products of this invention consist of a continuous oil phase composition in which microscopic droplets of a dispersed aqueous phase containing the water soluble polymer are present. Also present in the system are various surfactants which help stabilize the emulsion and aid in the release of the polymer at the point of end use.

Products of this type are commonly manufactured by a process consisting of the steps of raw material preparation, homogenization, reaction and product finishing.

Raw material preparation is accomplished by mixing the components of the aqueous and oil phases together in two separate vessels and often adjusting the pH of the aqueous phase.

In the case of acrylamide-dimethylaminoethyl methacrylate methyl chloride quaternary salt copolymerization, for example, the steps of raw material preparation are as follows:

1. The addition of the required quantities of acrylamide, dimethylaminoethyl methacrylate methylchloride quat, and deionized water.
2. The addition to the above mixture or a quantity of acid to adjust the pH to a value between 1.0 and 4.0, preferably between 3.0 and 4.0.
3. The addition of diethylene triamine penta acetic acid, pentasodium salt to chelate the copper present as a polymerization inhibitor in the acrylamide and cationic monomers.
4. The oil phase is prepared by placing the required amount of oil in the ultimate reaction vessel and mixing in the appropriate water-in-oil emulsifying agents.

Under some conditions, it may be necessary to heat the oil to ensure the good dissolution of emulsifying agents. This is particularly true in the cases where materials such as, sorbitan monostearate and other emulsifying agents which are solid at ambient temperatures.

Illustrative water-in-oil emulsifying agents that can be used are sorbitan monooleate, sorbitan monostearate, and ethoxylated derivatives of the former.

Oils can be of the general classes of mineral oils, deodorized kerosene or solvents such as xylene. A preferred class of oils are deodorized kerosenes with an aromatic content below 10%.

5. The aqueous phase is then pumped into the reaction vessel with agitation in the reaction vessel. The addition of aqueous phase to the oil assures proper initial formation of a water-in-oil emulsion.
6. Homogenization of the resulting reaction mass can be accomplished by several means. Immersion homogenizers, external recirculation through colloid mills or ultrasonic dispersion equipment and pumping the material at high pressure through small orifices can all be used effectively. The selection of the equipment to be used will, in large part, be determined by the surface active properties of the water-in-oil emulsion formed in Step 5. The key parameters are the average particle size and particle size distribution of the resulting emulsion. Normally it is sufficient that all particles be below 5 microns in diameter and the average particle size be about 1 micron.
7. The polymerization of the reaction mass must be preceded by an inert gas purge to eliminate dissolved oxygen which suppresses the reaction. Nitrogen is most commonly used for this. Once the dissolved oxygen is removed, the free radical initiator is added. Various oil soluble azo initiators are commonly used. Operating temperature and amount of initiator should be selected so that the reaction rate is as high as possible in large scale vessels (>250 gallons) within heat transfer limitations to minimize cleaning problems.
8. Once the reaction is completed, a detergent which aids in the release of the polymer must be added. This detergent is most typically an ethoxylated nonylphenol and it is added at a level of 1.0 to 4.0% relative to the overall reaction mass. This must be added gradually to allow even distribution in the reaction mass. The resulting product is then filtered to remove any suspended coagulum and packaged.

The effectiveness of the cationic emulsion polymer is evidenced in the examples presented hereinbelow.

Because of the particularly high molecular weights and activities of the subject polymers, they are especially effective in applications such as thickening agents, and flocculants as well as in applications such as, centrifuge sludge dewatering where they generally function at low concentrations. They show particular advantages, for example, in sewage treatment to thicken, dewater and remove phosphorus therefrom; in mineral processing to flocculate slimes and slurries and in paper manufacture to retain pigment, improve strength or alter the conductivity.

The invention also contemplates copolymers and terpolymers obtained by polymerization of mixtures of these monomers as well as water soluble mixtures of such monomers with various other polymerizable monomers in relative proportions that yield water soluble copolymers. Various copolymers may include acrylamide, methacrylamide, acrylonitrile, acrylic acid and salts thereof, dimethylamino ethyl methacrylate and quaternary salts thereof and other ethylenically unsaturated monomers. By selection of monomer combinations, polymers which are cationic, anionic, or amphoteric, can be made as desired.

The following examples are illustrative of the invention. The enumeration of details in the examples should not be interpreted as limitations except as may be expressed in the appended claims. Parts are parts by weight unless stated otherwise.

EXAMPLE 1

A cationic copolymer was produced using the following ingredients:

| Material | Quantity |
|---|---|
| Acrylamide (50% aqueous solution) (AM) | 110.0 grams |
| Dimethylaminoethylmethacrylate-Methyl Chloride Quat (75% aqueous solution) (QM) | 175.0 |
| Deionized water | 35.0 |
| Paraffinic Solvent | 150.0 |
| Ethoxylated Lauryl Alcohol | 8.75 |
| Sorbitan Monooleate | 8.75 |
| Ethoxylated Nonylphenol (activator) | 15 |
| Pentasodium salt of diethylenetriamine pentaacetic acid | 0.1 |
| 2,2'-azobis (2,4-dimethyivaleronitrile) | 0.015 |

All components, except surfactants, initiator and oil were combined and mixed while agitated in a vessel until homogeneous to form the aqueous phase. The pH of the aqueous phase was measured and found to be 5.3. The oil and surfactants were combined in an agitated, temperature controlled reactor.

The aqueous phase was then added to the reactor containing the oil-surfactant blend with mixing. This forms a crude emulsion. A homogenizer was then used to decrease the particle size to below 5 microns before polymerization.

The emulsion was then purged with nitrogen for about one hour and then the reaction mass was heated to 40° C. The initiator was then added and the reactor was then refluxed for ten hours. Samples were taken during the polymerization and analyzed for monomer content by HPLC. When the reaction was substantially complete the activator was added to the emulsion polymer. The results of the monomer analysis are set forth below in Table I.

TABLE I

| Time (hrs) | AM (%) | QM (%) | d (QM)/d (AM) |
|---|---|---|---|
| 0.00 | 11.08 | 30.70 | — |
| 2.00 | 10.19 | 27.38 | 3.73 |
| 4.50 | 6.93 | 5.45 | 6.73 |
| 5.50 | 1.92 | 0.00 | 1.09 |
| 6.50 | 0.40 | 0.00 | 0.00 |
| 7.50 | 0.22 | 0.00 | 0.00 |

The ratio of disappearance of QM to acrylamide is shown in the fourth column. The ratio should be as constant as possible over the course of the reaction to insure good charge distribution.

EXAMPLE 2

The procedure of Example 1 was followed except that hydrochloric acid was added to adjust the pH of the aqueous phase to pH 3.5. The results are summarized in the following Table II.

TABLE II

| Time (hrs) | AM (%) | QM (%) | d (QM)/d (AM) |
|---|---|---|---|
| 0.00 | 11.64 | 29.08 | — |
| 2.00 | 11.22 | 24.58 | 10.84 |
| 4.50 | 7.57 | 10.10 | 3.96 |
| 6.00 | 4.38 | 0.44 | 3.03 |
| 6.50 | 1.84 | 0.00 | 0.17 |
| 7.00 | 0.89 | 0.00 | 0.00 |

EXAMPLE 3

The procedure of Example 1 was followed except that succinic acid was used to bring the pH of the aqueous phase to 4.7. The results are summarized in the following Table III.

TABLE III

| Time (hrs) | AM (%) | QM (%) | d (QM)/d (AM) |
|---|---|---|---|
| 0.00 | 12.95 | 32.66 | — |
| 2.00 | 9.89 | 21.39 | 3.69 |
| 4.50 | 5.34 | 1.19 | 4.44 |
| 6.00 | .1.41 | 0.00 | 0.30 |
| 7.00 | 0.52 | 0.00 | 0.00 |

EXAMPLE 4

The procedure of Example 1 was followed except that succinic acid was used to bring the pH of the aqueous phase 3.5. The results are summarized in the following Table IV.

TABLE IV

| Time (hrs) | AM (%) | QM (%) | d (QM)/d (AM) |
|---|---|---|---|
| 0.00 | 11.21 | 28.16 | — |
| 2.00 | 10.47 | 25.86 | 3.09 |
| 4.50 | 8.00 | 11.62 | 5.77 |
| 6.00 | 5.09 | 1.14 | 3.60 |
| 7.00 | 2.19 | 0.00 | 0.39 |
| 7.50 | 1.12 | 0.00 | 0.00 |

EXAMPLE 5

The procedure of Example 1 was followed except that adipic acid was used to bring the pH of the aqueous phase 3.5. The results are summarized in the following Table V.

TABLE V

| Time (hrs) | AM (%) | QM (%) | d (QM)/d (AM) |
|---|---|---|---|
| 0.00 | 11.14 | 27.64 | — |
| 2.00 | 8.65 | 16.89 | 4.30 |
| 4.50 | 4.88 | 1.15 | 4.18 |
| 6.00 | 1.78 | 0.00 | 0.37 |
| 7.00 | 0.80 | 0.00 | 0.00 |

It is noted that when carboxylic acids are used, the ratios of monomer disappearance are much more constant.

EXAMPLE 6

A cationic copolmer was produced using the following ingredients using the procedure of Example 1:

| Material | Quantity |
|---|---|
| Acrylamide (50% aqueous solution) (AM) | 180.16 grams |
| Dimethylaminoethylmethacrylate-Methyl Chloride Quat (75% aqueous solution) (QM) | 43.38 |
| Deionized water | 35.0 |
| Paraffinic Solvent | 150.0 |
| Ethoxylated Lauryl Alcohol | 3.85 |
| Sorbitan Monooleate | 13.65 |
| Ethoxylated Nonylphenol (activator) | 11.0 |
| Pentasodium salt of diethylenetriamine pentaacetic acid | 0.1 |
| 2,2'-azobis (2,4-dimethylvaleronitrile) | 0.015 |
| Adipic Acid | 1.0 |

EXAMPLE 7

The procedure of Example 6 was followed with the exception that 8 grams of adipic acid were used.

EXAMPLE 8

The procedure of Example 6 was followed with the exception that 12 grams of adipic acid were used.

EXAMPLE 9

The procedure of Example 6 was followed with the exception that 16 grams of adipic acid were used.

Samples of the products from Examples 6 through 9 were then stored under ambient conditions for a period of four weeks. During the time the samples were analysis using a method of charge titration to determine the cationic content of the polymer (other methods, such as infrared spectroscopy could be suitable). The results are presented below:

TABLE VI

| Time (Weeks) | Example 6 | Example 7 | Example 8 | Example 9 |
|---|---|---|---|---|
| 0 | 12.48 | 11.98 | 10.3 | 12.5 |
| 1 | 11.08 | 12.06 | 12.5 | 11.95 |
| 2 | 11.67 | 10.67 | 8.06 | 7.84 |
| 3 | 13.34 | 10.74 | 7.94 | 6.69 |
| 4 | 11.7 | 10.36 | 8.87 | 7.69 |

As shown from the foregoing data and by reference to the figure of the drawing, the general conclusion here is that the cationic charge is relatively stable until a high level of dicarboxylic acid is added. This level corresponds roughly to decreasing the pH below 3.

EXAMPLE 10

The specific filter resistance test compares the comparative dewatering capabilities of different polymers on an individual sludge. The method consists of adding polymer to the sludge to be dewatered, filtering the flocculated sludge and monitoring the quantity of filtrate drained over time.

The SFR (specific filter resistance) is calculated by an equation comparing the filtrate drained over time and a number of parameters:

$$t/v = \mu W^\circ a v / 2 \Delta P A^2$$

Where
t = time
v = Volume of filtrate
W° = Weight of solids deposited per unit volume of filtrate
$\mu$ = Absolute viscosity of the water
$\Delta P$ = Pressure drop across the sludge cake
A = Cross-sectional area of the cake
a = Specific resistance of the sludge cake Plotting t/v vs v, and all the parameters are known except for a (specific resistance of the sludge cake); a can then be calculated by measuring the slope of the t/v vs-Y curve in the initial linear region.

Varying the dosages of the polymer, a series of points with different SFR's can be found for the polymer of interest on a sludge, showing the dewatering ability of that polymer. By using a different polymer on the same sludge, a comparison between the two polymers can be observed. A polymer working at lower SFR's use a lower dose is, according to this well accepted test, the more effective product. Further background information can be found in Weber, J. Physiochemical Processes for Water Quality Control, pp. 566–567 Wiley-Interscience Publishers, New York, 1972.

The products of Examples 1 through 5 were evaluated using the following technique:

Aliquots of 500 milliliters of tap water were placed in 800 milliliter flasks and 2.5 grams each of the products of Examples 1 through 5 were added to each of the flasks under the conditions of vigorous mixing. The mixing was continued for one-half hour after the addition of the polymer.

Quantities of the resulting solution were added to 100 milliliter aliquots of anaerobic digested sludge obtained from the Syracuse Metropolitan Waste Water Treatment Plant. Doses used were in the range of 20 to 140 parts per million of polymer.

The resulting polymer-sludge mix was agitated by pouring the mixture back and fourth from one mixing cup to the next twelve times. The resulting flocculated sludge was then filtered in a 55 milliliter Buchner funnel with a disk of filter cloth serving to retain the sludge solids. Filtration rates were then measured and the specific filter resistances calculated according to the previous discussion. Results are set forth in Table VII below.

TABLE VII

| Dose (ppm) | SFR (gm²/sec) |
|---|---|
| Example 1 | |
| 1.04E + 02 | 1.00E + 06 |
| 1.20E + 02 | 5.10E + 05 |
| 1.36E + 02 | 2.35E + 05 |
| 1.51E + 02 | 1.94E + 05 |
| 1.67E + 02 | 5.38E + 05 |
| Example 2 | |
| 8.70E + 01 | 6.50E + 06 |
| 1.04E + 02 | 1.60E + 06 |
| 1.20E + 02 | 4.90E + 05 |
| 1.36E + 02 | 2.60E + 05 |
| 1.52E + 02 | 1.19E + 05 |

TABLE VII-continued

| Dose (ppm) | SFR (gm²/sec) |
| --- | --- |
| 1.67E + 02 | 6.80E + 04 |
| Example 3 | |
| 1.04E + 02 | 7.00E + 05 |
| 1.20E + 02 | 2.60E + 05 |
| 1.36E + 02 | 7.08E + 04 |
| 1.44E + 02 | 6.10E + 04 |
| 1.51E + 02 | 1.67E + 06 |
| Example 4 | |
| 1.04E + 02 | 9.00E + 05 |
| 1.20E + 02 | 5.90E + 05 |
| 1.36E + 02 | 2.56E + 05 |
| 1.44E + 02 | 1.00E + 05 |
| 1.52E + 02 | 2.28E + 05 |
| Example 5 | |
| 1.04E + 02 | 7.30E + 05 |
| 1.21E + 02 | 2.00E + 05 |
| 1.36E + 02 | 2.70E + 05 |
| 1.53E + 02 | 1.30E + 04 |
| 1.29E + 02 | 8.20E + 04 |

It is noted that, in general, the performance of the samples containing carboxylic acids was superior to those containing mineral acids and that the samples with the most favorable reaction rate ratios outperformed those with the less favorable reaction rate ratios.

It will be understood that various modifications may be effected without departing from the scope of the invention and the several details disclosed herein as illustrative are not to be construed as placing limitations on the invention except as may be required by the recitation in the appended claims.

What is claimed is:

1. A method of preparing a water soluble cationic acrylamide polymer having more uniform cationic quaternary amine functional unit distribution which comprise acidifying a co-monomer of the formula $$CH_2=RC-CONH_2 \quad (a)$$

wherein R is H or $CH_3$ with an acid containing carboxylate groups having a pKa greater than 1 to provide a pH in the range of between about 2.0 and 4.5 and polymerizing said monomer (a) with a monomer having quaternary amine units and having the formula $$CH_2=CHR,COOCH_2CH_2N(CH_3)_3+R_2^-(b)$$

where $R_1$ is H or $CH_3$ and $R_2$ is $Cl^-$ or $CH_3OSO_3-$ and polymerizing the mixture of (a) and (b) to substantial completion.

2. The method of claim 1 wherein the co-monomer mixture contains also a different ethylenically unsaturated monomer.

3. The process of claim 1, where the acid is dicarboxylic acid.

4. The process of claim 3, where the acid is adipic acid.

5. The process of claim 1, where the acid is succinic acid.

6. The process of claim 1, where the pH is adjusted to below 4.

7. The process of claim 1, where the pH is adjusted to between 3 and 4.

8. The process of claim 1, where the acid is adipic acid and the pH is between 3 and 4.

9. The process of claim 1 where the acid is succinic acid and the pH is between 3 and 4.

10. The process of claim 1 wherein the polymerization is effected by emulsion polymerization.

* * * * *

UNITED STATES PATENT AND TRADEMARK OFFICE
CERTIFICATE OF CORRECTION

PATENT NO. : 4,668,747
DATED : May 26, 1987
INVENTOR(S) : Cadel et al.

It is certified that error appears in the above-identified patent and that said Letters Patent is hereby corrected as shown below:

Claim 1, Column 10, line 12 of the Patent
"$CH_2=CHR,COOCH_2CH_2N(CH_3)_3^+R_2^-(b)$" should read
--$CH_2=CHR_1COOCH_2CH_2N(CH_3)_3^+R_2^-(b)$--.

Signed and Sealed this

Sixth Day of October, 1987

*Attest:*

DONALD J. QUIGG

*Attesting Officer*  *Commissioner of Patents and Trademarks*